June 3, 1952   J. P. MINTON   2,599,064
SEISMIC PROSPECTING
Filed July 22, 1946   2 SHEETS—SHEET 2
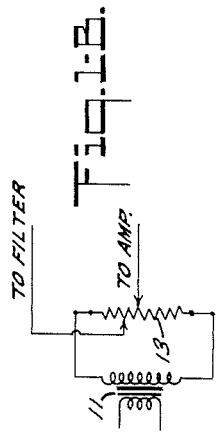
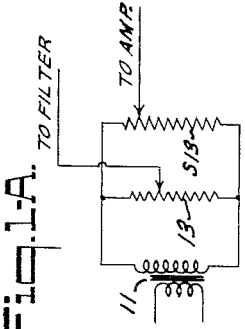
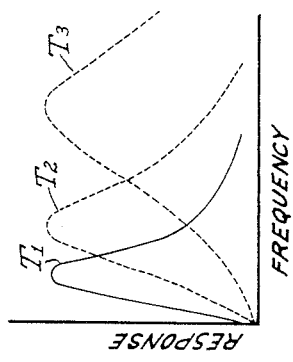
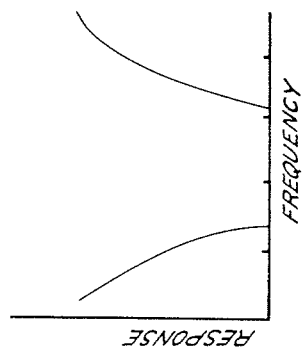
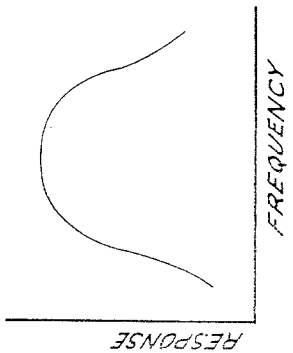
INVENTOR.
JOHN P. MINTON
BY
Sidney G. Johnson
ATTORNEY Patented June 3, 1952

2,599,064

UNITED STATES PATENT OFFICE 2,599,064

SEISMIC PROSPECTING

John P. Minton, Dallas, Tex., assignor, by mesne assignments, to Socony-Vacuum Oil Company, Incorporated, New York, N. Y., a corporation of New York Application July 22, 1946, Serial No. 685,334

9 Claims. (Cl. 177—352)

This invention relates to seismic prospecting and particularly to systems in which signal channels respectively associated with the geophones of a spread are cross-connected so to effect mixing of the geophone signals to produce a composite record in which the reflections may be readily identified.

In seismic prospecting an explosive charge is detonated in a shothole in order to generate seismic waves for detection by geophones or other sensitive wave-responsive devices. As those skilled in the art know, considerable skill is required in interpretation of seismograms or records of the detected seismic waves to recognize reflections as distinguished from local disturbances which also affect the geophones. These disturbances arise because the explosion of the charge produces seismic waves not only within the frequency range of those which are reflected from subsurface strata, but also frequencies outside of that range. Moreover, there are present during the time of taking a seismogram many seismic waves which are not the result of a reflection from an interface but which represent the continued presence of local seismic energy within the frequency range of the reflections it is desired to record. By utilizing a plurality of geophones generally known as a spread, it is possible by comparing the several seismograms to recognize reflections. It has also been proposed to mix the signals from the several geophones so that the local and unwanted extraneous disturbances, including ground roll and wind strays, will be eliminated or greatly reduced in amplitude by reason of cancellation. Theoretically, the improvement obtainable by mixing should be proportional to the square root of the number of channels mixed. However, such an improvement has not previously been achieved in practical operation and the improvement realized does not seem to increase to an expected degree when the outputs of three and higher numbers of geophones are mixed in one channel.

It is an object of the present invention to provide mixing arrangements which improve the seismograms by amounts more nearly proportional to the square root of the number of channels mixed; and particularly to secure improvements of that order upon mixing of the signals from three and more geophones prior to recording a seismogram.

In accordance with the present invention, the cross-channel connections for mixing of signals of different channels include filters which may either favor the frequencies corresponding with those of seismic waves so to attain reinforcement of the signal frequencies of interest in the record, or they may favor the undesired signal frequencies which have mutually cancelling effects in the mixing because of phase differences, so to minimize in the composite record the frequencies corresponding with undesired disturbances: in either event, the cross-channel includes a mixer tube for asymmetric passage between the signal channels of the frequencies passed by the filter.

While the mixture of two or more channels produces an improvement in a seismogram without the inclusion of said filters, further improvements are achieved by reason of the filters and therefore the invention is utilizable to advantage in the mixing of less than three channels as well as three and more channels.

The invention further resides in features of combination and arrangement hereinafter described and claimed.

For a more detailed explanation of the invention, and for further objects and advantages, reference is made to the accompanying drawings, in which:

Figs. 1A and 1B illustrate alternative arrangements for controlling the magnitude of the mixing; and Figs. 2–4 inclusive are explanatory figures referred to in discussion of the operation of the system shown in Fig. 1.

Figure 1:
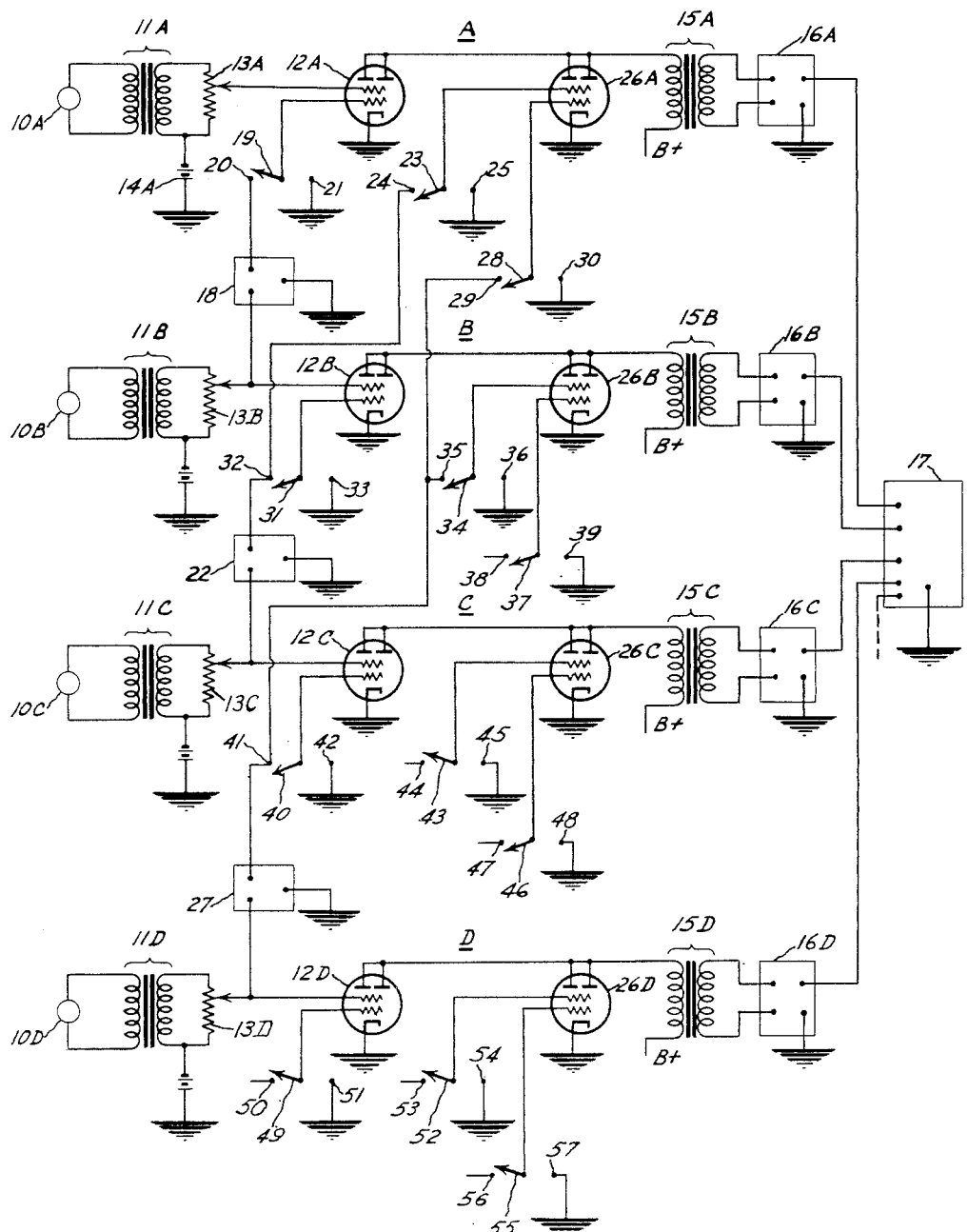
Fig. 1 is a circuit diagram, in simplified form, of a geophone spread utilizing selected frequency mixing.

Referring to Fig. 1, each of the geophones 10A, 10B, 10C and 10D, suitably spaced to form a spread along the area under survey, produces in response to reception of seismic waves a signal output which is transmitted through a corresponding one of the signal channels A to D to the associated element of a recorder 17, which produces a composite record which can be analyzed to determine the depth, slope and other information concerning subterranean strata. The signal output produced by the geophone 10A, for example, is impressed upon the input circuit of an amplifier having a suitable number of stages. For simplicity of explanation only a single stage is shown.

In the input circuit 12A of the amplifier is included a coupling transformer 11A connected to the geophone. Preferably as shown, the control grid of the amplifying tube is connected to a potential dividing resistor 13A which may be manually adjustable to determine the percentage of the total available input voltage that is applied to the amplifier tube. The output or anode circuit of the tube 12A includes the primary of a transformer 15A, whose secondary circuit may be included in the input of one or more additional amplifier stages 16A.

Similarly, the geophones 10B and 10D of each of the other channels B to D is provided with an amplifier tube, input and output transformers, and a potential dividing resistance. For brevity of explanation, the corresponding circuit elements of the several channels are identified by the same reference characters, differing, however, by the suffix corresponding with the channel designation.

In the system as thus far described, the individual geophones 10A to 10D respond not only to the seismic waves which it is desired to record but also to unwanted disturbances which are minimized, as appearing in the seismograph record, by the selective frequency cross-channel connections now described. The input terminals of a filter 18 are connected to the signal channel B for impression thereon of the signals produced by geophone 10B; for example, the input circuit of the filter may be connected in shunt to the amplifier tube 12B. By closure of switch 19 to effect engagement with its contact 20, the output signal of the filter is impressed upon the input electrodes of a mixing tube whose plate circuit is included in channel A. The frequencies of signal channel B which are passed by filter 18 are injected into signal channel A; because the transmission characteristic of the cross-channel is asymmetric, due to the mixing tube, those same frequencies are not transmitted from channel A to channel B. In short, the cross-channel including filter 18, as well as the other cross-channels later discussed, is frequency-selective and asymmetric. The mixing tube may be a separate tube, or as shown, may be comprised in tube 12A which may for both amplifying and mixing purposes be of a type like or similar to the 6L7.

The filter 18 may be of the band-pass type having a frequency-response characteristic generally similar to that shown in Fig. 2. In such event, the filter 18 selects from the signal output of the geophone 10B a desired band of frequencies, usually from about thirty cycles to seventy cycles per second, corresponding with those of seismic waves under study and impresses such frequency band upon the tube 12A for admixture with all of the signal frequencies produced by the geophone 10A. As the reflected waves from deep strata arrive substantially at the same time at the spaced geophones of a spread, the reflected wave signal energy selected by filter 18 from channel B and introduced into channel A by the mixing tube is additive in channel A to the reflected wave seismic signals produced by geophone 10A.

The system shown also includes a filter 22 associated with channel C for selecting from the signals produced by geophone 10C the signal frequencies corresponding with those of the seismic waves. By closure of switch 23 to effect engagement of its contact 24, the output of the filter 22 is impressed upon a pair of input electrodes of a second mixer tube 26A whose output circuit is included in channel A. Thus, there is provided mixing with the signals of geophone 10A selected frequencies of the signal output produced by geophone 10C. Similarly, by closure of switch 28 to effect engagement of contact 29, another input section of tube 26A or another physically separate mixing tube is connected to a filter 27 associated with channel D for admixture with the signals produced by geophone 10A of selected frequencies of the signals produced by geophone 10D.

Accordingly, by selective actuation of the switches 19, 23 and 28 there may be mixed in channel A selected frequencies of the signals produced by any one or more of the other geophones, so to produce a composite signal in which the undesired components of the signal output produced by geophone 10A are insignificant compared to the desired frequency components as enhanced by the additive effect of the mixed channels.

When the cross-channel connection to a particular one of the other channels is not desired, the corresponding switch 19, 23 or 28 is moved to its other ineffective position in engagement with contacts 21, 25 and 30 respectively to apply a predetermined fixed voltage, which as shown may be zero voltage, to the corresponding control electrode or grid of the associated mixing tube so to avoid any significant change of the operating voltage of other tubes used for amplification or mixing which are energized from the same power supply.

Channel B associated with geophone 10B is similarly provided with switches for selected admixture with the signals produced by geophone 10B of selected frequencies of the signals produced by any one or more of the other geophones of the spread. For example, by movement of switch contact 31 out of engagement with the grounded contact 33 and into engagement with contact 32, the output of the filter 22 is applied to a pair of input electrodes of the mixer tube 12B, thus to mix with the signal in channel B the selected frequencies of the signal produced by geophone 10C. Similarly, by actuation of switch contact 34 from engagement with the fixed contact 36 and into engagement with contact 35, the filter 27 is connected to the input electrodes of one section of mixer tube 26B for admixture with the signals in channel B of the selected frequencies of the signals produced by geophone 10D. In like manner, the switch comprising contacts 37, 38 and 39 may be actuated for mixture with the signals in channel B of the selected frequencies of the signals produced by geophone 10A or, in a geophone spread having more than four geophones, of the selected frequencies of any one of the additional channels not shown.

In generally like manner, to the signals produced by geophone C there may be added the selected frequencies of the signals in any one or more of the other channels, thus effectively to minimize in the resulting composite signal output the undesired frequencies produced by the geophone 10C. For example, selected frequencies in the signal output of geophone 10D may be introduced into channel C by closure of switch 40 to effect engagement of contact 41. The frequencies selected by filter 27 are impressed upon a pair of input electrodes of the second section of tube 12C, or of a physically separate mixer tube, whose output circuit is included in channel C. In like manner, the switches comprising contacts 43, 44, 45 and 46, 47, 48 may be selectively actuated for connection to the sections of the mixer tube 26C the filters associated with other channels of the spread, only lead lines of which are shown.

Channel D may similarly be provided with mixing tubes and cross-channel selector switches 49—51, 52—54 and 55—57 providing for admixture with the signals produced by the geophone 10D of the selected frequencies of the signals in any one or more of the other signal channels of the spread.

By the arrangement described, the signal output of any one or more of the channels may to selected extent include the seismic signals of the geophone of that channel and any one or more of the other channels with additive effect only of the signal frequencies corresponding with seismic waves of a desired frequency band and with no more signal component due to extraneous disturbances, such as ground roll and wind strays, than would be present without mixing. So far as the resulting record is concerned, the effect is that of enhanced prominence of the curve characteristics relied upon in determination of the depth and slope of subsurface strata.

With the construction of variable resistors 13A—13D shown in Fig. 1, the positions of their adjustable contacts control both the amount of mixing and also the magnitudes of unfiltered signals applied to the amplifiers of the respective channels. To afford additional flexibility by independent control of the mixing and the unfiltered signal input, the resistors 13A—13D may be replaced by either of the arrangements shown in Figs. 1A and 1B. In the former, the input lead to the corresponding filter 18, 22 or 27 is connected to the movable contact of voltage-dividing resistor 13 whereas the input lead to the amplifier tube 12B, 12C or 12D is connected to the movable contact of a second voltage-dividing resistor S13 in shunt to resistor 13. The same independence of control, which is of advantage under circumstances such that a reflection would not otherwise carry through on all of the traces, may be obtained by providing each of the resistors 13A—13D with two adjustable contacts, as shown in Fig. 1B, connected respectively to the associated filter and to the associated amplifier tube.

It is also possible to produce records in which the unwanted signal disturbances are minimized by using band-elimination filters having generally characteristics such as shown in Fig. 3. In the event the filters 18, 22 and 27, and others not shown, are of this type, the frequencies selected for interchannel mixing are the frequencies corresponding with the unwanted disturbances, usually up to about thirty cycles and above seventy cycles, but since these disturbances generally arrive at the geophones of the spread at different times, or out of phase, the effect of the mixing is to more or less effect their mutual cancellation. In any event, the overall effect so far as the ultimate record is concerned, is generally the same as that attained by filters of the band-pass type, namely, emphasis in the record of the seismic wave signals and minimization of signals due to undesired disturbances.

The cross-channel filters 18, 22 and 27 may each be of type disclosed in my co-pending application, Serial No. 679,991 whose frequency response as shown by curves T1, T2 and T3 of Fig. 4, automatically varies as a function of time in the interval following a shot so that the frequencies selected from the signals of individual channels for admixture with the geophone signals of one or more of the other channels shift with time continuously to favor the reflections from deeper and deeper strata. Thus, throughout the recording interval there is in the output signal of a channel not only the normal extraneous signal component of that single channel but also the cumulative seismic output signal produced by several geophones in response to reflected seismic waves whose predominant frequency changes during the recording interval.

While the mixing of four channels has been shown in detail, it is to be understood that the output signals from any desired number of geophones may be mixed together in accordance with the invention and that in each case there will be further improvement of the seismogram in the elimination of the local disturbances and in the emphasis of the reflected waves which arrive substantially simultaneously at the several geophones in avoidance of the cancellation effect which is enhanced by reason of the present invention.

While a preferred form of the invention has been described and illustrated, it is to be understood modifications may be made within the scope of the appended claims.

What is claimed is:

1. A seismic prospecting system comprising at least two geophones for producing signals in the seismic frequency range of about thirty to seventy cycles per second in response to reflections of a shot impulse from subsurface strata and also responsive to local seismic disturbances resulting from said shot impulse to produce undesired signals, a corresponding number of recording means, signal channels each between one of said geophones and one of said recording means, and at least one frequency-selective asymmetric cross-channel connection including a filter and a mixing tube providing for asymmetric passage of selected frequencies from one to another of said channels, thereby in advance of its application to said recording means to modify the geophone signal of the corresponding channel by the asymmetric mixing therewith of selected frequencies of the geophone signal from at least one other channel so to enhance in the signal record produced by said recording means the frequencies of aforesaid range corresponding with reflections from subsurface strata.

2. A seismic prospecting system comprising at least two geophones for producing signals in the seismic frequency range of about thirty to seventy cycles per second in response to reflections of a shot impulse from subsurface strata and also responsive to local seismic disturbances resulting from said shot impulse to produce undesired signals, a corresponding number of recording means, signal channels each between one of said geophones and one of said recording means, and at least one frequency-selective asymmetric cross-channel connection including a band-pass filter and a mixing tube providing for asymmetric passage of desired seismic signal frequencies from a first to a second of said channels for cumulative effect upon the recorder associated with said second channel of the same desired seismic signal frequencies impressed upon both of said channels by the geophones respectively associated therewith.

3. A seismic prospecting system comprising at least two geophones for producing signals in the seismic frequency range of about thirty to seventy cycles per second in response to reflections of a shot impulse from subsurface strata and also responsive to local seismic disturbances resulting from said shot impulse to produce undesired signals, a corresponding number of recording means, signal channels each between one of said geophones and one of said recording means, and at least one frequency-selective asymmetric cross-channel connection including a band-elimination filter and a mixing tube providing for asymmetric passage of undesired signal frequencies from a first to a second of said channels for differential effect upon the recorder associated with said second channel of the same undesired signal frequencies impressed upon both of said channels by the geophones respectively associated therewith.

4. A seismic prospecting system comprising a plurality of geophones for producing signals in the seismic frequency range of about thirty to seventy cycles per second in response to reflections of a shot impulse from subsurface strata and also responsive to local seismic disturbances resulting from said shot impulse to produce undesired signals, a corresponding number of recording means, signal channels each between one of said geophones and one of said recording means, and frequency-selective asymmetric cross-channel connections, each including a filter and a mixing tube, jointly providing for asymmetric passage to at least one of said channels of selected frequencies from at least two other of said channels, thereby in advance of its application to said recording means to modify the geophone signal of the corresponding channel by the asymmetric mixing therewith of the same selected frequencies of the geophone signals from at least two other channels so to enhance in the signal record produced by said recording means the frequencies of aforesaid range corresponding with reflections from subsurface strata.

5. A seismic prospecting system comprising a plurality of geophones for producing signals in the seismic frequency range of about thirty to seventy cycles per second in response to reflections of a shot impulse from subsurface strata and also responsive to local seismic disturbances resulting from said shot impulse to produce undesired signals, a corresponding number of recording means, signal channels each between one of said geophones and one of said recording means, and frequency-selective asymmetric cross-channel connections, each including a filter and a mixing tube, jointly providing for asymmetric passage of the same selected seismic frequencies from one of said channels to at least two other of said channels, to enhance in said recording means the frequencies corresponding with reflections from subsurface strata.

6. A seismic prospecting system comprising a plurality of geophones for producing signals in the seismic frequency range of about thirty to seventy cycles per second in response to reflections of a shot impulse from subsurface strata and also responsive to local seismic disturbances resulting from said shot impulse to produce undesired signals, a corresponding number of recording means, signal channels each between one of said geophones and one of said recording means, and frequency-selective asymmetric cross-channel connections, each including a filter and a mixing tube, jointly providing for asymmetric passage to each of said channels of the same selected seismic frequencies from at least one other of said channels, to enhance in said recording means the frequencies corresponding with reflections from subsurface strata.

7. A seismic prospecting system comprising a plurality of geophones for producing signals in the seismic frequency range of about thirty to seventy cycles per second in response to reflections of a shot impulse from subsurface strata and also responsive to local seismic disturbances resulting from said shot impulse to produce undesired signals, a corresponding number of recording means, signal channels each between one of said geophones and one of said recording means, and means for impressing the same selected seismic frequencies from each of one or more of said signal channels upon at least one other of said signal channels comprising a plurality of asymmetric frequency-selective cross-channels, each including a filter and a mixing tube, and cross-channel selector switching means.

8. A seismic prospecting system comprising a plurality of geophones for producing signals in the seismic frequency range of about thirty to seventy cycles per second in response to reflections of a shot impulse from subsurface strata and also responsive to local seismic disturbances resulting from said shot impulse to produce undesired signals, a corresponding number of recording means, signal channels each between one of said geophones and one of said recording means, and means for impressing the same form of desired signal energy from each of one or more of said signal channels upon at least one other of said signal channels comprising a plurality of asymmetric frequency-selective cross-channels each including a band-pass filter selectively allowing passage of the desired signal-frequencies and a mixing tube, and cross-channel selector switching means, to enhance the frequencies corresponding with reflections from subsurface strata.

9. A seismic prospecting system comprising a plurality of geophones for producing signals in the seismic frequency range of about thirty to seventy cycles per second in response to reflections of a shot impulse from subsurface strata and also responsive to local seismic disturbances resulting from said shot impulse to produce undesired signals, a corresponding number of recording means, signal channels each between one of said geophones and one of said recording means, and means for impressing undesired signal energy from each of one or more of said signal channels upon at least one other of said signal channels comprising a plurality of asymmetric frequency-selective cross-channels each including a band-elimination filter selectively allowing passage of the undesired signal-frequencies and a mixer tube, and cross-channel selector switching means, to reduce the frequencies corresponding with local seismic disturbances.

JOHN P. MINTON.

REFERENCES CITED

The following references are of record in the file of this patent:

UNITED STATES PATENTS

| Number | Name | Date |
| --- | --- | --- |
| 2,038,202 | Weis, Jr. | Apr. 21, 1936 |
| 2,272,613 | Phelps | Feb. 10, 1942 |
| 2,329,519 | Dixon | Sept. 14, 1943 |
| 2,500,820 | Hanert | Mar. 14, 1950 |